US012444432B2

(12) United States Patent
Sawano

(10) Patent No.: US 12,444,432 B2
(45) Date of Patent: Oct. 14, 2025

(54) EMOTION TAG ASSIGNING SYSTEM, METHOD, AND PROGRAM

(71) Applicant: FUJIFILM Corporation, Tokyo (JP)

(72) Inventor: Mitsuru Sawano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 12 days.

(21) Appl. No.: 17/883,608

(22) Filed: Aug. 9, 2022

(65) Prior Publication Data

US 2023/0049225 A1    Feb. 16, 2023

(30) Foreign Application Priority Data

Aug. 10, 2021    (JP) ................... 2021-130617

(51) Int. Cl.
*G10L 25/63* (2013.01)
*G10L 17/04* (2013.01)
*G10L 25/78* (2013.01)

(52) U.S. Cl.
CPC ............. *G10L 25/63* (2013.01); *G10L 17/04* (2013.01); *G10L 25/78* (2013.01)

(58) Field of Classification Search
CPC ......... G10L 25/63; G10L 17/04; G10L 25/78; G10L 17/00; H04M 9/10
See application file for complete search history.

(56) References Cited

U.S. PATENT DOCUMENTS

| | | | |
|---|---|---|---|
| 10,225,608 | B2 | 3/2019 | Shigeta et al. |
| 2012/0287218 | A1* | 11/2012 | Ok ..................... H04N 7/15 348/14.02 |
| 2016/0142767 | A1* | 5/2016 | Shigeta ............. H04N 21/4788 725/12 |
| 2019/0340250 | A1* | 11/2019 | Rakshit ................. G06F 40/295 |
| 2020/0105265 | A1 | 4/2020 | Kuriya et al. |
| 2021/0390140 | A1 | 12/2021 | Nagata et al. |

FOREIGN PATENT DOCUMENTS

| | | |
|---|---|---|
| JP | 2007329794 | 12/2007 |
| JP | 2010057003 | 3/2010 |
| JP | 2017111760 | 6/2017 |
| WO | 2014192457 | 12/2014 |
| WO | 2020158536 | 8/2020 |

OTHER PUBLICATIONS

"Notice of Reasons for Refusal of Japan Counterpart Application", issued on May 8, 2025, with English translation thereof, p. 1-p. 10.

* cited by examiner

*Primary Examiner* — Huyen X Vo
(74) *Attorney, Agent, or Firm* — JCIPRNET

(57) ABSTRACT

Provided are an emotion tag assigning system, method, and program for assigning, to a content, an emotion tag indicating an emotion of a user in execution of an event using the content.
An emotion tag assigning method includes a step of detecting, by a voice detector, voice data indicating a voice uttered by a person who participates in an event using a content during execution of the event; a step of recognizing, by an emotion recognizer, an emotion of the person based on the voice data; a step of acquiring, by a processor, emotion information indicating the recognized emotion of the person during the execution of the event using the content; and a step of assigning, by the emotion recognizer, an emotion rank calculated from the acquired emotion information to the content as an emotion tag.

9 Claims, 8 Drawing Sheets

EMOTION TAG ASSIGNING SYSTEM, METHOD, AND PROGRAM

CROSS-REFERENCE TO RELATED APPLICATION

The present application claims priority under 35 U.S.C § 119(a) to Japanese Patent Application No. 2021-130617 filed on Aug. 10, 2021, which is hereby expressly incorporated by reference, in its entirety, into the present application.

BACKGROUND OF THE INVENTION

1. Field of the Invention

The present invention relates to an emotion tag assigning system, method, and program, and particularly relates to a technique for assigning an emotion tag relating to a user's emotion to content.

2. Description of the Related Art

In the related art, a system has been known in which a large amount of content data such as image files including moving images and photographs and audio files is stored in a storage, and the files are selectively read out from the storage to be continuously reproduced like a slide show.

WO2020/158536A proposes an information processing system used in such a system to reduce a burden on a user from registration to retrieval and reading of content data with tags.

The information processing system disclosed in WO2020/158536A generates, from information on a user and behavior of the user, one or more pieces of tag information for content data of the user, and registers the generated one or more pieces of tag information in a content database in association with the content data.

In a case of retrieval and reading, the information processing system selects tag information based on information detected from a content viewing environment including the user, and retrieves one or more pieces of content data from the content database based on the selected tag information and sequentially reproduces them.

By the way, WO2020/158536A discloses that in a case where tag information is assigned to the content data of the image file, the content data (captured image) of the image file is analyzed, emotion information is estimated from a facial expression of a person included in the captured image, and tag information including the estimated emotion information is assigned to the image file. The emotion information is information estimated from a facial expression such as "joyful" and "sad".

SUMMARY OF THE INVENTION

In a case where the tag information is assigned to the content data of the image file, the information processing system disclosed in WO2020/158536A analyzes the content data (captured image) of the image file, estimates the emotion information from the facial expression of the person included in the captured image, and assigns the tag information including the estimated emotion information to the image file.

However, the emotion information estimated from the facial expression of the person included in the captured image is emotion information at the time when the captured image was taken (in the past), and is not emotion information at the time when the content was viewed by a user who viewed the captured image.

In addition, WO2020/158536A discloses that an image of a content viewing environment is acquired by using a fixed-point observation camera or the like in a case of viewing the content, a person of a subject is recognized from the acquired image, and an emotion is estimated from the facial expression of the person. However, the emotion estimated is used in a case where the tag information for retrieval is updated to tag information of "joyful" in a case where the emotion changes to a specific emotion such as "joyful" (smiley facial expression), and the content data is re-retrieved and switched to reproduction presentation.

The present invention has been made in view of such circumstances, and an object thereof is to provide an emotion tag assigning system, method, and program capable of assigning, to a content, an emotion tag indicating an emotion of a user in execution of an event using the content.

In order to achieve the above object, the invention according to a first aspect relates to an emotion tag assigning system comprising: a processor; a voice detector that detects voice data indicating a voice uttered by a person who participates in an event using a content during execution of the event; and an emotion recognizer that recognizes an emotion of the person based on the voice data, in which the processor acquires emotion information indicating the emotion of the person recognized by the emotion recognizer during the execution of the event using the content, and assigns an emotion rank calculated from the acquired emotion information to the content as an emotion tag.

According to the first aspect of the present invention, during the execution of the event using the content, the voice data indicating the voice uttered by the person who participates in the event is detected, and the emotion information indicating the emotion of the person is acquired based on the detected voice data. An emotion rank calculated from the acquired emotion information is assigned to the content as an emotion tag.

As a result, the emotion tag indicating the emotion of the user in the execution of the event can be assigned to the content, an effect of a degree of delight of an event participant (value of the event) can be quantified for each time zone, and anyone can clearly determine which content has a high effect. In addition, the emotion tag is used in execution of the next event, whereby it is possible to execute a highly effective event reflecting the emotion tag.

In the emotion tag assigning system according to a second aspect of the present invention, it is preferable that the emotion recognizer is a recognizer that is subjected to machine learning using, as training data, a large number of pieces of voice data including voice data of a voice uttered in a case where a person is delighted and voice data of a voice uttered in a case where the person is not delighted. As a result, emotion information indicating the emotion of the user (person) who participates in the event and indicating a degree of delight can be accurately recognized.

In the emotion tag assigning system according to a third aspect of the present invention, it is preferable that the content is a plurality of images, and that the event is an appreciation event for sequentially reproducing the plurality of images by an image reproduction device and appreciating the reproduced plurality of images.

In the emotion tag assigning system according to a fourth aspect of the present invention, it is preferable that the plurality of images include a photograph or a moving image showing the person who participates in the event. This is to make the participants who participate in the event be interested in and enjoy the event.

In the emotion tag assigning system according to a fifth aspect of the present invention, it is preferable that the processor acquires, from the emotion recognizer, a plurality of pieces of emotion information in a time zone in which the plurality of images are reproduced, calculates an emotion rank corresponding to each image from a representative value of the plurality of pieces of emotion information, and assigns the calculated emotion rank to each image as the emotion tag.

In the emotion tag assigning system according to a sixth aspect of the present invention, it is preferable that in a case where a plurality of persons participate in the event, the processor specifies one or more main speakers in the time zone in which the plurality of images are reproduced based on the voice data detected by the voice detector, and assigns speaker identification information indicating the specified one or more main speakers to each image.

In the emotion tag assigning system according to a seventh aspect of the present invention, it is preferable that the processor displays at least one of the emotion rank or the speaker identification information simultaneously with the plurality of images during the reproduction of the plurality of images by the image reproduction device.

In the emotion tag assigning system according to an eighth aspect of the present invention, it is preferable that the processor converts the voice data into text data based on the voice data detected by the voice detector, and assigns at least a part of the text data to a corresponding image in the plurality of images as a comment tag.

The invention according to a ninth aspect relates to an emotion tag assigning method comprising: a step of detecting, by a voice detector, voice data indicating a voice uttered by a person who participates in an event using a content during execution of the event; a step of recognizing, by an emotion recognizer, an emotion of the person based on the voice data; a step of acquiring, by a processor, emotion information indicating the recognized emotion of the person during the execution of the event using the content; and a step of assigning, by the emotion recognizer, an emotion rank calculated from the acquired emotion information to the content as an emotion tag.

In the emotion tag assigning method according to a tenth aspect of the present invention, it is preferable that the content is a plurality of images, and that the event is an appreciation event for sequentially reproducing the plurality of images by an image reproduction device and appreciating the reproduced plurality of images.

In the emotion tag assigning method according to an eleventh aspect of the present invention, it is preferable that the plurality of images include a photograph or a moving image showing the person who participates in the event.

In the emotion tag assigning method according to a twelfth aspect of the present invention, it is preferable that the processor acquires, from the emotion recognizer, a plurality of pieces of emotion information in a time zone in which the plurality of images are reproduced, calculates an emotion rank corresponding to each image from a representative value of the plurality of pieces of emotion information, and assigns the calculated emotion rank to each image as the emotion tag.

In the emotion tag assigning method according to a thirteenth aspect of the present invention, it is preferable that in a case where a plurality of persons participate in the event, the processor specifies one or more main speakers in the time zone in which the plurality of images are reproduced based on the voice data detected by the voice detector, and assigns speaker identification information indicating the specified one or more main speakers to each image.

In the emotion tag assigning method according to a fourteenth aspect of the present invention, it is preferable that the processor displays at least one of the emotion rank or speaker information specified by the speaker identification information simultaneously with the plurality of images during the reproduction of the plurality of images by the image reproduction device.

In the emotion tag assigning method according to a fifteenth aspect of the present invention, it is preferable that the processor converts the voice data into text data based on the voice data detected by the voice detector, and assigns at least a part of the text data to a corresponding image in the plurality of images as a comment tag.

The invention according to a sixteenth aspect relates to an emotion tag assigning program causing a computer to implement: a function of acquiring, from a voice detector, voice data indicating a voice uttered by a person who participates in an event using a content during execution of the event; a function of recognizing an emotion of the person based on the voice data; a function of acquiring emotion information indicating the recognized emotion of the person during the execution of the event using the content; and a function of assigning an emotion rank calculated from the acquired emotion information to the content as an emotion tag.

According to the present invention, it is possible to assign, to a content, an emotion tag indicating an emotion of a user in execution of an event using the content. As a result, a value of the event is quantified, whereby it is possible to clearly determine which content has a high effect. In addition, the emotion tag is used in execution of the next event, whereby it is possible to execute a highly effective event reflecting the emotion tag.

DESCRIPTION OF THE PREFERRED EMBODIMENTS

Hereinafter, preferred embodiments of an emotion tag assigning system, method, and program according to the present invention will be described with reference to the accompanying drawings.

Configuration of Emotion Tag Assigning System

Figure 1:
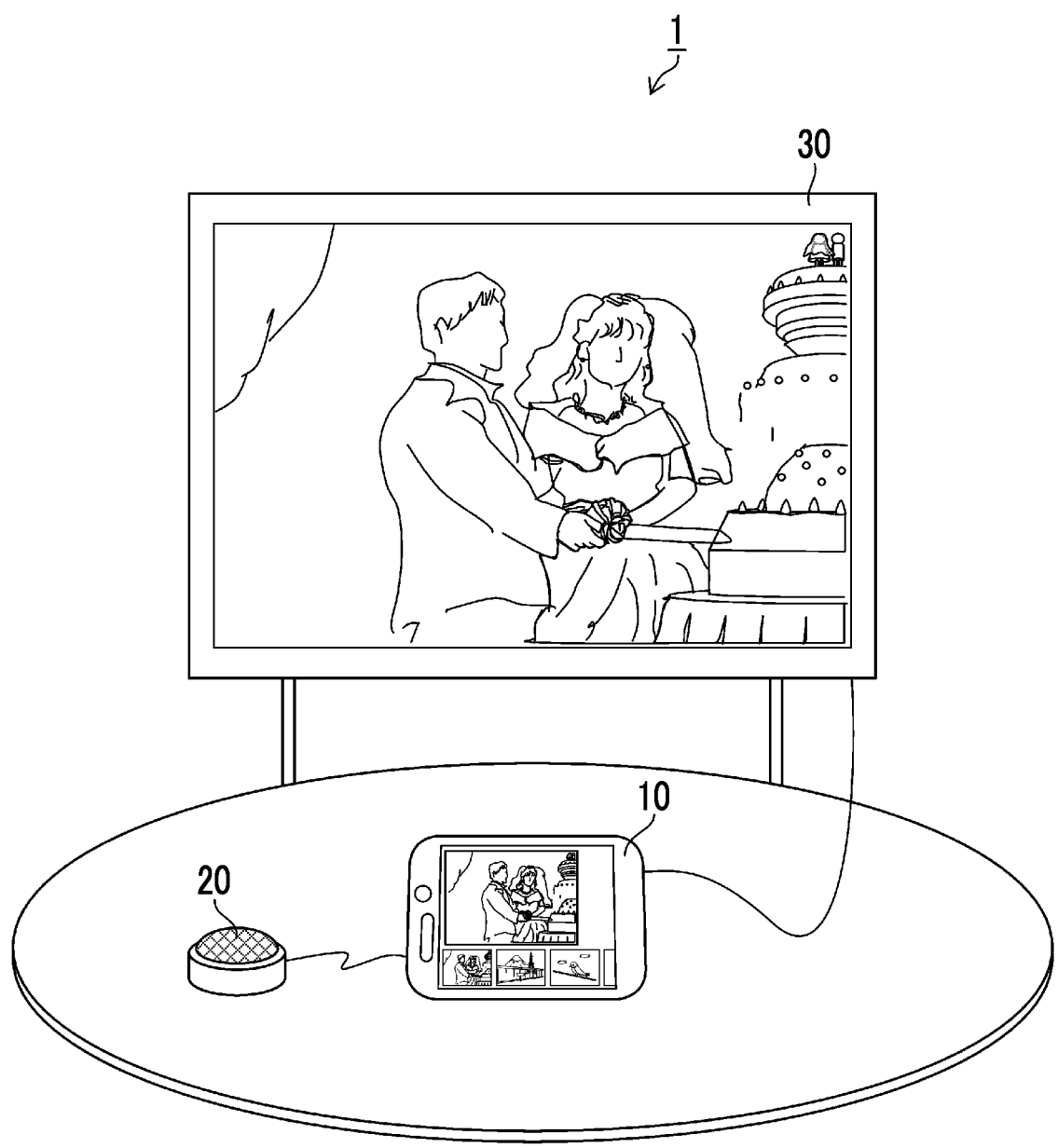
FIG. 1 is a schematic configuration diagram showing an embodiment of an emotion tag assigning system according to an aspect of the present invention.

FIG. 1 is a schematic configuration diagram showing an embodiment of an emotion tag assigning system according to the present invention.

An emotion tag assigning system 1 shown in FIG. 1 comprises a tablet personal computer (PC) 10 and a voice detector 20. The voice detector 20 may be built in the tablet PC 10.

FIG. 1 shows a large display 30 that displays a video (image) based on a video signal from the tablet PC 10.

Figure 2:
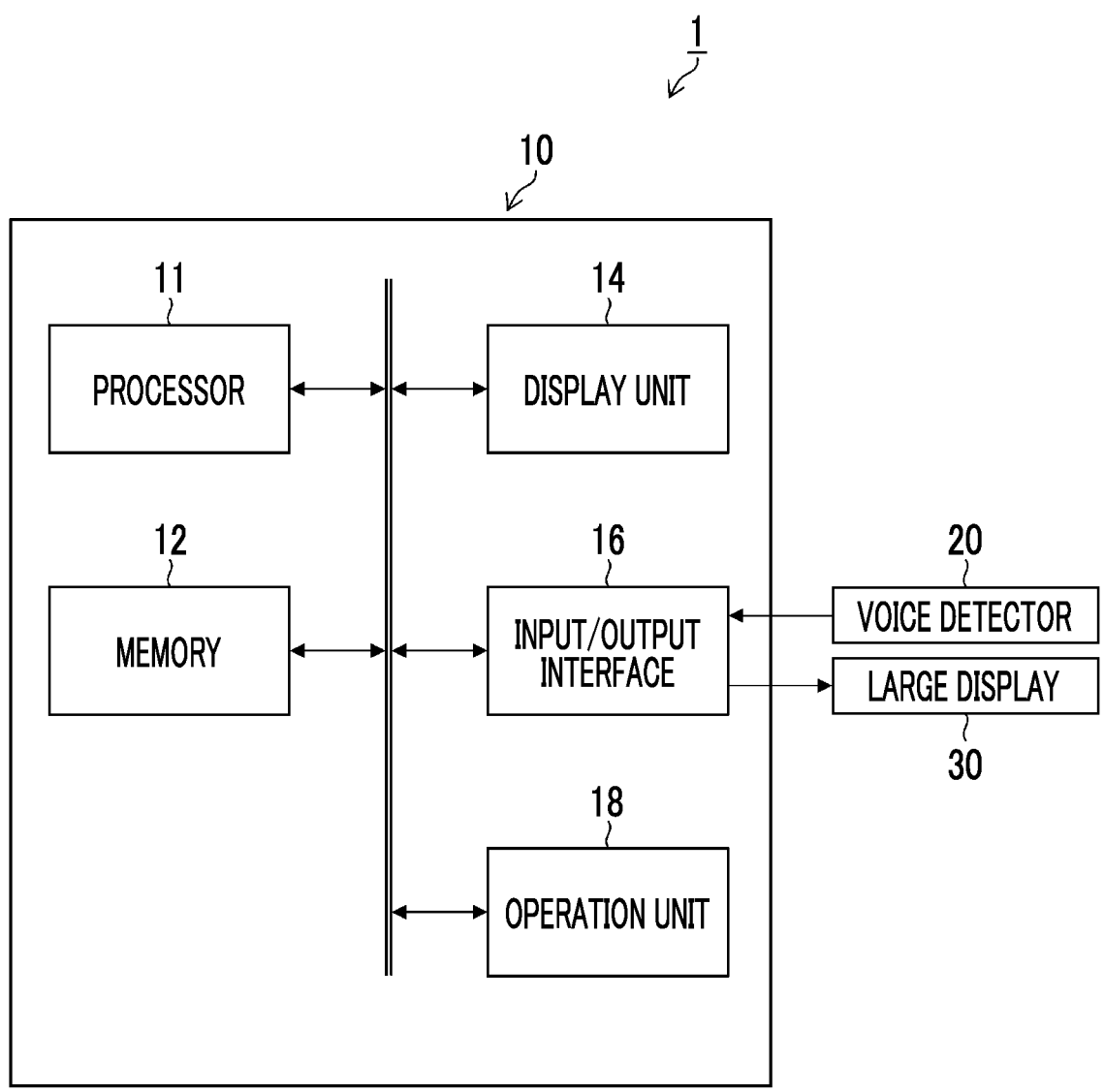
FIG. 2 is a block diagram showing the embodiment of the emotion tag assigning system according to the aspect of the present invention.

FIG. 2 is a block diagram showing the embodiment of the emotion tag assigning system according to the present invention, and in particular, is a block diagram of the tablet PC 10.

The tablet PC 10 constituting the emotion tag assigning system 1 shown in FIG. 2 comprises a processor 11, a memory 12, a display unit 14, an input/output interface 16, and an operation unit 18.

Figure 4:
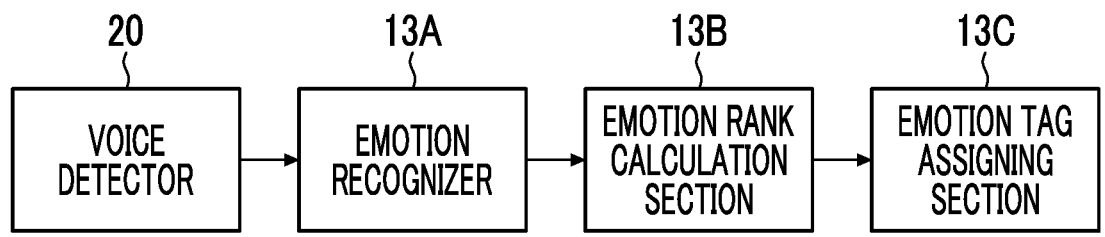
FIG. 4 is a diagram showing an embodiment in which an emotion tag is assigned to a content based on voice data indicating a voice uttered by an event participant during execution of an event.

The processor 11 is composed of a central processing unit (CPU) and the like, and integrally controls each part of the tablet PC 10, and functions, for example, as an emotion recognizer 13A, an emotion rank calculation section 13B, and an emotion tag assigning section 13C shown in FIG. 4.

The memory 12 includes, for example, a flash memory, a read-only memory (ROM), a random access memory (RAM), and a hard disk apparatus. The flash memory, ROM, or hard disk apparatus is a non-volatile memory for storing an operation system, an emotion tag assigning program according to the embodiment of the present invention, a content (a plurality of images in the present example), and various programs including a trained model for making the tablet PC 10 (processor 11) function as the emotion recognizer 13A. The RAM functions as a work region for processing by the processor 11. In addition, the emotion tag assigning program or the like stored in the flash memory or the like is temporarily stored. A part (RAM) of the memory 12 may be built in the processor 11.

The tablet PC 10 of the present example can execute an event by using the content stored in the memory 12. In a case where the content is a plurality of images, the tablet PC 10 can execute an appreciation event in which the plurality of images are sequentially reproduced using the large display 30 and an event participant appreciates the reproduced plurality of images.

In addition to displaying a screen for operation of the tablet PC 10, the display unit 14 displays a list of images (thumbnail images) used for the appreciation event in a case where the appreciation event is executed, and is also used as a part of a graphical user interface (GUI) in a case of receiving an input instruction of selecting and switching an image (photograph) from the operation unit 18 by a touch operation of a touch panel provided on a screen of the display unit 14.

The input/output interface 16 includes a connection unit connectable to an external apparatus and a communication unit connectable to a network. As the connection unit connectable to an external apparatus, a microphone input terminal, a universal serial bus (USB), a high-definition multimedia interface (HDMI) (HDMI is a registered trademark), or the like can be applied.

The processor 11 can acquire the voice data detected by the voice detector (microphone) 20 via the input/output interface 16. In addition, the processor 11 can output a video signal to the large display 30 via the input/output interface 16. In a case of executing the appreciation event, instead of the large display 30, a projector may be connected to the input/output interface 16 to output a video signal to the projector.

The operation unit 18 includes a touch panel provided on the screen of the display unit 14 in addition to a start button and a volume button (not shown), and the touch panel functions as a part of a GUI that receives various designations by the user.

Example of Event

The appreciation event using a plurality of images may be, for example, an appreciation meeting of a photo slide show held at a facility such as a long-term care health facility, a special nursing home for the elderly, a kindergarten, or a school.

In the case of an appreciation meeting of a photo slide show held at a facility, an event executing person may be a staff member of the facility or an event trustee from the facility, and an event participant may be a user of the facility.

In a case where the event is an appreciation meeting of a photo slide show, the event executing person prepares a plurality of images as content. The "plurality of images" may be a moving image created from a plurality of photographs in addition to a plurality of still images (photographs), or may include both a photograph and a moving image. The "photograph" may be not only a photograph captured by a normal camera but also an image such as a picture or a character, and includes a picture or a short sentence on which an original is drawn, a picture or a character (a brush or the like) drawn by an original, and the like. This is because an image with strong feelings of the original can also have a reminiscence effect.

The event executing person borrows the photographs, albums, and the like of the event participants. In a case where the photographs are paper-based, the event executing person carries out scanning on the photographs by a scanner to create computerized image files, and stores the image file in the memory 12, and, in a case where the photographs are image files stored in a memory card or a mobile terminal, the stored image files are stored in the memory 12.

It is preferable that the photograph shows a person who participates in the event (event participant). Alternatively, it is preferable to include photographs or moving images of family or associates, alma mater, organization, or region, favorite hobbies, her or his own work, favorite work, favorite talent, and favorite region, facility, or event of the person who participates in the event. This is to make the participants who participate in the event be interested in and enjoy the event. In addition, it is preferable to store the image file of the event participants in a folder created for each event participant.

Photo slide show software is installed in the flash memory of the memory 12, and the tablet PC 10 functions as an image reproduction device for executing a photo slide show using a plurality of photographs stored in the memory 12 by starting the photo slide show software.

In a case of executing a photo slide show, the event executing person displays a list of thumbnail images used for the photo slide show on the display unit 14, operates the tablet PC 10 while observing reactions of the event participants, and performs a photo slide show of a format for creating a favorable reaction by switching a plurality of images (photographs) to the next photograph at a favorable time, returning to the previous photograph, skipping the next photograph, or arranging two photographs.

The appreciation event using a plurality of photographs is not limited to the photo slide show described above, but may be an appreciation meeting in which a moving image (photo movie) created from a plurality of photographs, in which a plurality of images (photographs) are connected by known photo movie creation software and special effects are applied to switching of the photographs or a way of showing the photographs, is reproduced by the tablet PC 10 functioning as an image reproduction device and the large display 30, and the event participants appreciate the photo movie.

Outline of Present Invention

According to the present invention, the voice detector 20 detects voice data indicating a voice uttered by an event participant during execution of an event using a content, an emotion of the event participant in the execution of the event is analyzed from the voice data, an emotion tag indicating time-series emotions of the event participant is assigned to the content used for the event, and the emotion tag is used in the execution of an event using the same content next time, and an event having a high effect on the event participant can be executed.

In the case of an appreciation event for appreciating a photo slide show, emotion information indicating an emotion of an event participant is acquired for each photograph used for the photo slide show, and an emotion rank calculated from the acquired emotion information is assigned to a content (each photograph) as an emotion tag.

First Embodiment of Emotion Tag Assigning System

Figure 3:
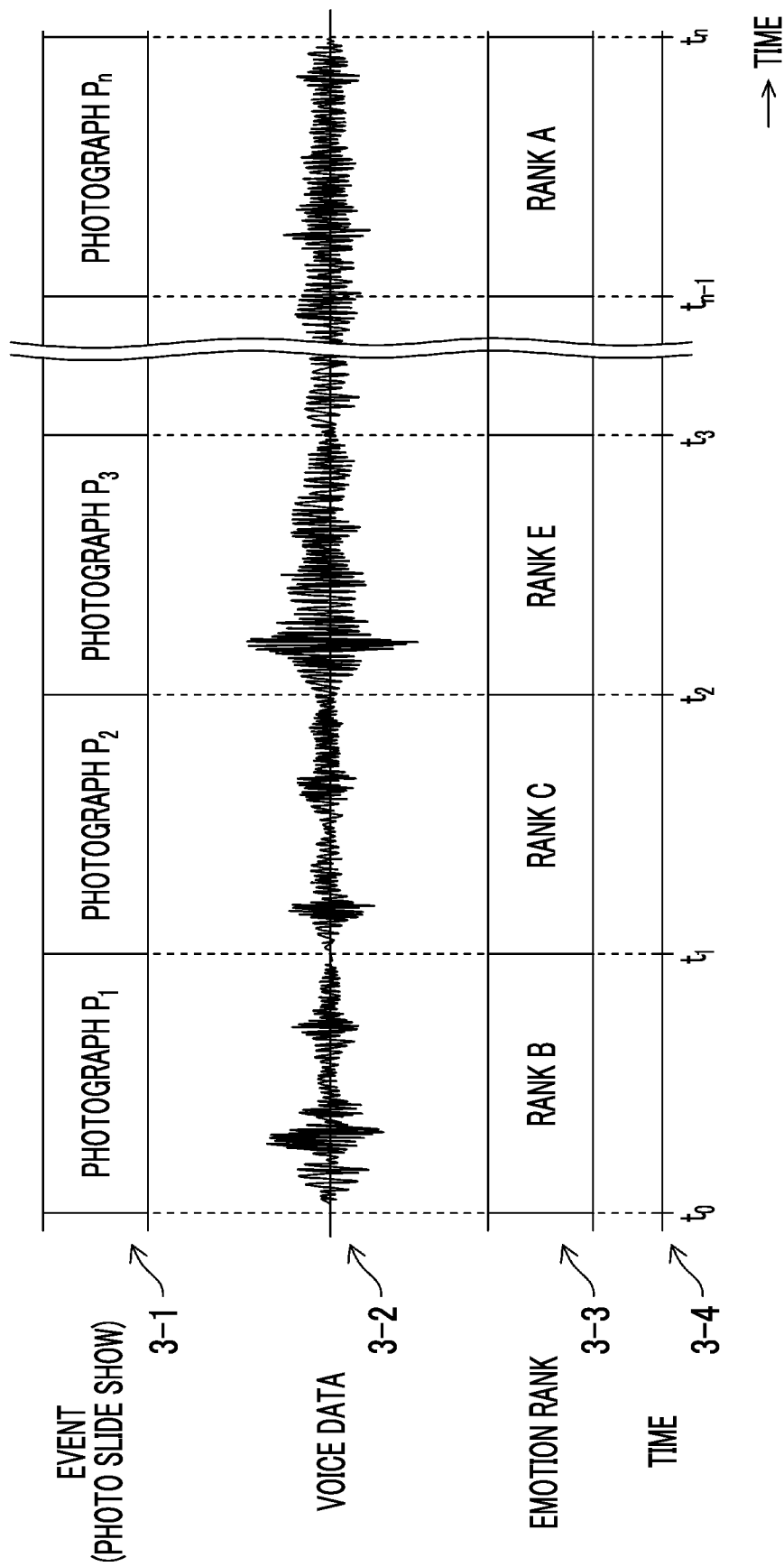
FIG. 3 is a timing chart showing a first embodiment of the emotion tag assigning system according to the aspect of the present invention.

FIG. 3 is a timing chart showing a first embodiment of the emotion tag assigning system according to the present invention, and particularly shows a case where an appreciation event of a photo slide show is executed.

A part 3-1 of FIG. 3 shows time-series photographs displayed sequentially at the appreciation event of the photo slide show. At this appreciation event, a plurality of images (n pieces of photographs $P_1$ to $P_n$) are sequentially displayed. As described above, in a case of executing a photo slide show, the event executing person displays a list of thumbnail images used for the photo slide show on the display unit 14, operates the tablet PC 10 (touch panel) while observing reactions of the event participants, and displays n pieces of photographs $P_1$ to $P_n$ by switching the photographs appropriately.

A part 3-2 of FIG. 3 is a waveform diagram of voice data (analog data) indicating the voice generated by the event participants detected by the voice detector 20 during the appreciation event of the photo slide show.

A part 3-3 of FIG. 3 is a diagram showing an emotion rank of the event participants for each photograph calculated from the voice data. A method of calculating the emotion rank will be described below.

An emotion rank corresponding to each photograph shown in the part 3-3 of FIG. 3 is assigned to a corresponding photograph as an emotion tag.

A part 3-4 of FIG. 3 is a diagram showing a reproduction time of each photograph of the appreciation event. The photograph $P_1$ is reproduced during a period of points in time $t_0$ to $t_1$. $t_0$ is a start point in time of the photo slide show. Similarly, the photograph $P_2$ is reproduced during a period of points in time $t_1$ to $t_2$, the photograph $P_3$ is reproduced during a period of points in time $t_2$ to $t_3$, and the photograph $P_n$ is reproduced during a period of points in time $t_{n-1}$ to $t_n$.

Assigning Emotion Tag

FIG. 4 is a diagram showing an embodiment in which an emotion tag is assigned to a content based on voice data indicating a voice uttered by the event participant during the execution of an event.

As shown in FIG. 4, the processor 11 shown in FIG. 2 functions as an emotion recognizer 13A, an emotion rank calculation section 13B, and an emotion tag assigning section 13C.

The emotion recognizer 13A can be realized, for example, by executing a trained model for emotion recognition stored in the memory 12, recognizes an emotion of a person (event participant) who has uttered a voice based on the voice data indicating the voice uttered by the event participant during the execution of the event from the voice detector 20, and outputs emotion information indicating the emotion of the event participant from time to time.

The trained model can be configured by, for example, a convolution neural network (CNN) which is one of learning models.

A CNN is trained through machine learning using a large number of pieces of training data datasets shown below and thereby can be a trained CNN (trained model).

From the voice data of a subject acquired at a data rate of 16.6 kHz, only the voice data of a section determined by an evaluator that the subject is delighted is extracted in units of 0.2 seconds and used as Vah, and only the voice data of a section determined that the subject is not delighted is extracted in units of 0.2 seconds and used as Nv.

The voice data of Vt and Vin are separated every 1 second, energy (power spectrum) for each frequency from 100 Hz to 8000 Hz is calculated every 20 ms, and two-dimensional patterns of energy of a horizontal axis time (10 for 0.2 seconds every 20 ms) and a vertical axis frequency (80 up to 8000 Hz every 100 Hz) are created. Two-dimensional patterns of a plurality of Vo's and two-dimensional patterns of a plurality of Nv's created in this way are used as training data.

By training a CNN having a plurality of layer structures using the data set of the training data through machine learning, a plurality of weight parameters and the like are optimized to obtain a trained CNN.

It is preferable that the data set of the training data is created from a plurality of pieces of voice data of subjects in an age group of a user of a facility.

In a case where the voice data is input from the voice detector 20, the emotion recognizer 13A creates a two-dimensional pattern of energy every 20 ms in the same manner as in a case of creating the training data, extracts a feature amount from the two-dimensional pattern, and outputs emotion information (inference result) indicating whether the subject is delighted or not.

The emotion rank calculation section 13B acquires emotion information in a time zone of display of one photograph, which is sequentially output from the emotion recognizer 13A, and calculates, for example, a degree of certainty indicating that the subject is delighted as an emotion rank of 5 levels (ranks A to E). In the present example, it is assumed that the degree of certainty indicating that the subject is delighted increases in the order of $A<B<C<D<E$.

The emotion rank can be calculated from a representative value (for example, a maximum value, an average value, or a mode value) of a plurality of pieces of emotion information in the time zone of display of one photograph.

In the present example, the emotion rank is calculated based on the degree of certainty indicating that the subject is delighted, but the present invention is not limited thereto, and the emotion rank may be calculated according to the magnitude of the delight. In addition, kinds of emotion such as happiness, anger, sorrow, and pleasure, as well as the emotion of the delight, and the emotion rank for each kind of the emotions may be calculated.

The emotion tag assigning section 13C assigns the emotion rank calculated by the emotion rank calculation section 13B as the emotion tag to a photograph (content) displayed in the time zone in which the emotion information is acquired. The assignment of the emotion tag to the photograph can be performed by recording the emotion tag in a header of an image file of the photograph or by creating a text file or the like in which the emotion tag is described in relation to a file name of the image file or a reproduction time zone of the content.

Thus, the emotion tag indicating the emotion of the user (event participant) in the execution of the event can be assigned to the content, a value of the event can be quantified for each time zone, and anyone can clearly determine which content has a high effect. In addition, the emotion tag is used in execution of the next event, whereby it is possible to execute a highly effective event reflecting the emotion tag.

Second Embodiment of Emotion Tag Assigning System

Figure 5:
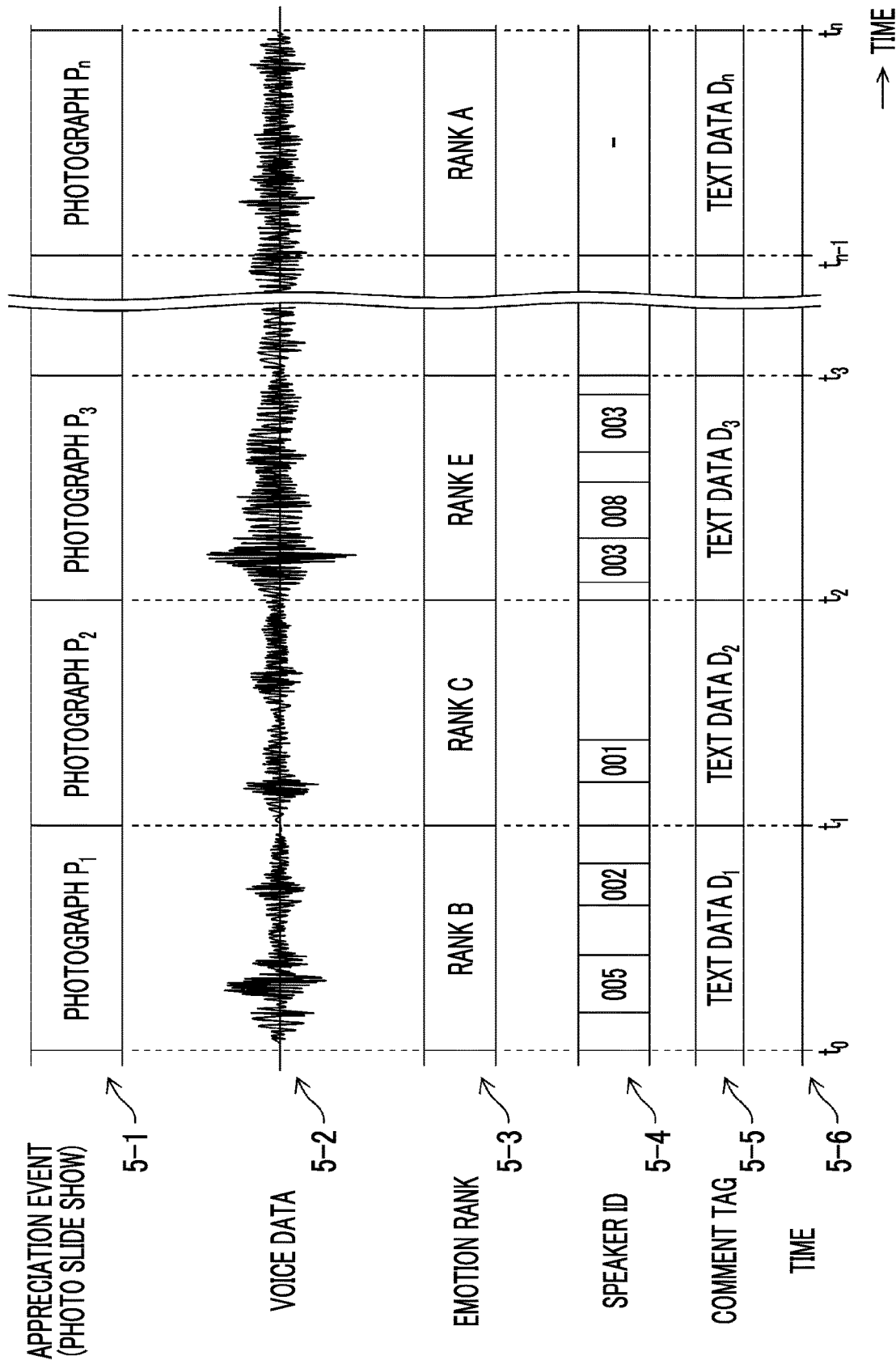
FIG. 5 is a timing chart showing a second embodiment of the emotion tag assigning system according to the aspect of the present invention.

FIG. 5 is a timing chart showing a second embodiment of the emotion tag assigning system according to the present invention.

A part 5-1 of FIG. 5 shows time-series photographs displayed sequentially at the appreciation event of the photo slide show, a part 5-2 is a waveform diagram of voice data indicating the voice generated by the event participants detected by the voice detector 20 during the appreciation event of the photo slide show, a part 5-3 is a diagram showing an emotion rank of the event participants for each photograph calculated from the voice data, and a part 5-6 is a diagram showing a reproduction time of each photograph of the appreciation event.

Since the parts 5-1 to 5-3 and 5-6 of FIG. 5 are common to the part 3-1 to 3-4 shown of FIG. 3, detailed description thereof will be omitted.

A part 5-4 of FIG. 5 is a diagram showing speaker identification information (speaker identification (ID)) indicating one or more main speakers specified from the voice data.

A part 5-5 of FIG. 5 is a diagram showing text data $D_1$ to $D_n$ converted from the voice data.

The second embodiment shown in FIG. 5 is different from the first embodiment shown in FIG. 3 in that a speaker ID indicating a main speaker specified based on the voice data detected in a time zone of display of each photograph in the appreciation event is assigned to a corresponding photograph, and that text data $D_1$ to $D_n$ (including at least a part of text data converted for each display time zone) converted based on the voice data detected in the time zone of the display of each photograph is added as a comment tag of the corresponding photograph.

Assignment of Emotion Tag, Speaker ID, and Comment Tag

Figure 6:
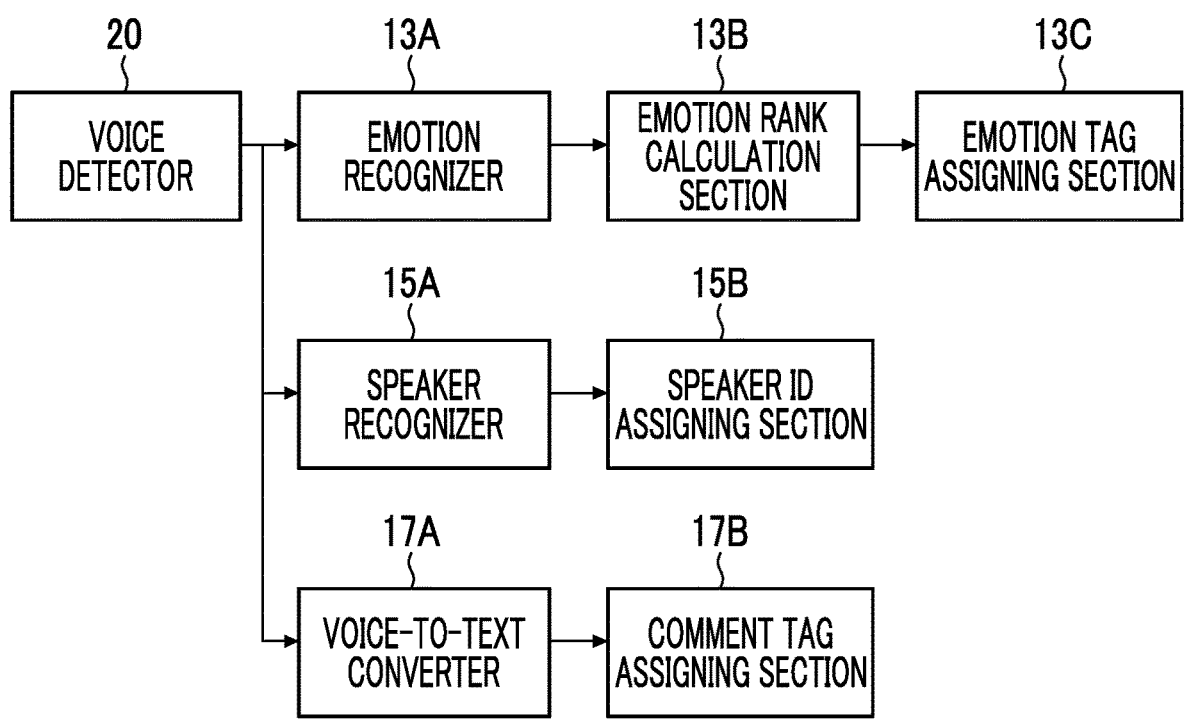
FIG. 6 is a diagram showing an embodiment in which an emotion tag, a speaker ID, and a comment tag is assigned to a content based on voice data indicating a voice uttered by an event participant during execution of an event.

FIG. 6 is a diagram showing an embodiment in which an emotion tag, a speaker ID, and a comment tag is assigned to a content based on voice data indicating a voice uttered by an event participant during execution of an event.

As shown in FIG. 6, the processor 11 shown in FIG. 2 functions as an emotion recognizer 13A, an emotion rank calculation section 13B, an emotion tag assigning section 13C, a speaker recognizer 15A, a speaker ID assigning section 15B, a voice-to-text converter 17A, and a comment tag assigning section 17B.

Components shown in FIG. 6 common to the embodiment shown in FIG. 4 will be denoted by the same reference numerals as those shown in FIG. 4, and the detailed description thereof will be omitted.

In FIG. 6, the speaker recognizer 15A recognizes an individual (speaker) from a human voice, and information (for example, "voiceprint") indicating a voice waveform of each speaker who is an event participant is previously registered in the speaker recognizer 15A in association with a speaker ID, speaker information (name of a speaker) specified by the speaker ID, and the like. The speaker ID shown in the part 5-4 of FIG. 5 is a three-digit number.

The speaker recognizer 15A specifies one or more main speakers in each time zone in which a plurality of photographs are sequentially reproduced based on the voice data detected by the voice detector 20 during the execution of the appreciation event by a rate of match of "voiceprint", and outputs a speaker ID indicating the specified one or more main speakers.

The speaker ID assigning section 15B assigns one or more speaker ID's calculated by the speaker recognizer 15A to a photograph (content) displayed in a time zone in which the speaker ID is acquired.

The voice-to-text converter 17A converts the voice data into text data based on the voice data detected by the voice detector 20 during the execution of the appreciation event. The processor 11 functions as the voice-to-text converter 17A by executing known voice-to-text conversion software.

The comment tag assigning section 17B assigns at least a part of the text data converted by the voice-to-text converter 17A as a comment tag to a photograph (content) displayed in a time zone in which the text data is acquired.

According to the second embodiment of the emotion tag assigning system, a speaker ID and a comment tag can be assigned to the content together with the emotion tag.

The processor 11 can display at least one of the emotion rank, the speaker information, or the text data simultaneously with the corresponding photograph during the reproduction of each photograph.

As a result, a participant with a high emotion rank and a participant with a low emotion rank at present are known, so that feedback can be made on how to do the event. For example, the event can be improved by displaying next an event such as a photograph with a high emotion rank in the past for a participant with a low emotion rank at present.

First Embodiment of Emotion Tag Assigning Method

Figure 7:
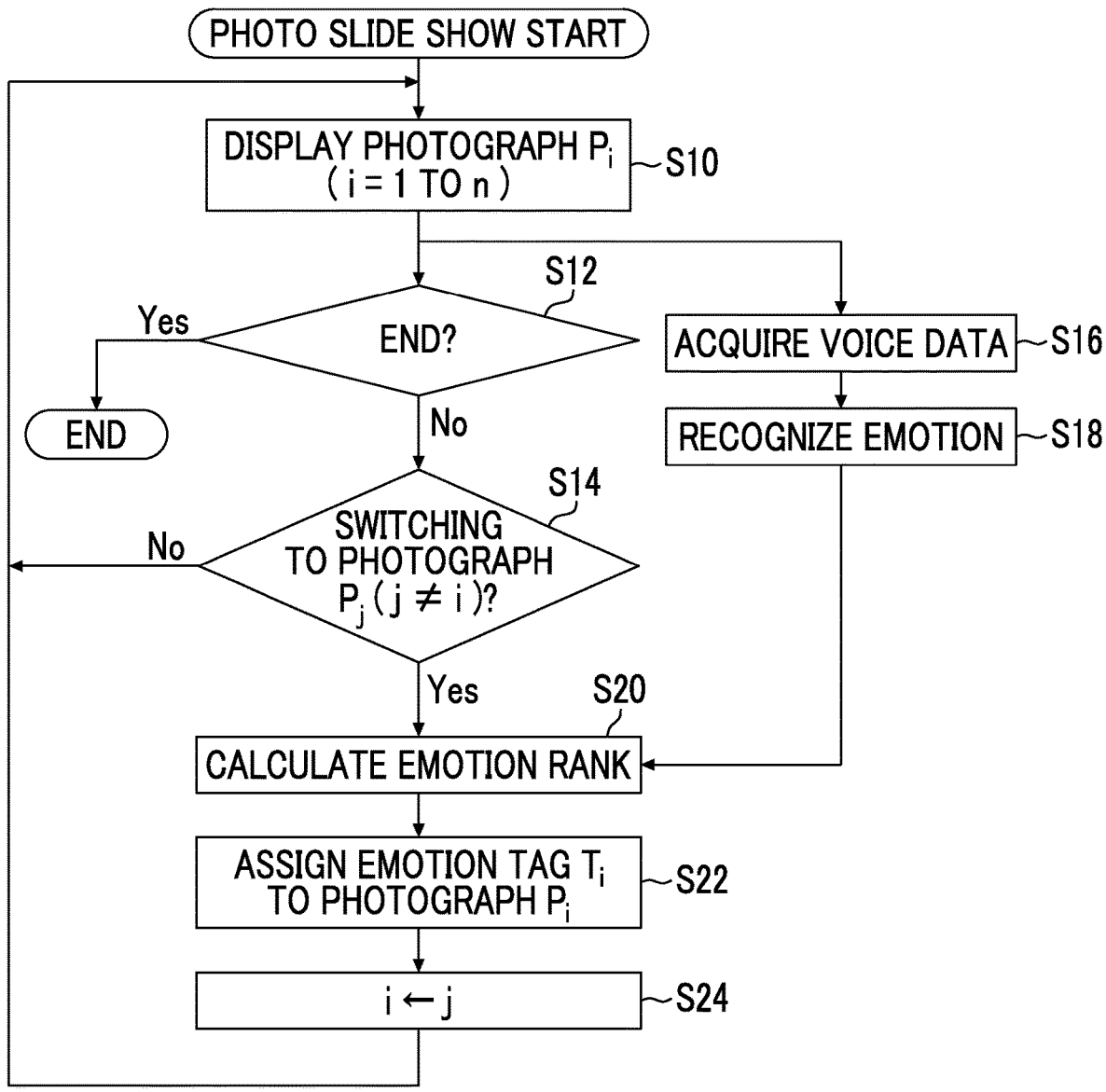
FIG. 7 is a flowchart showing a first embodiment of an emotion tag assigning method according to the aspect of the present invention.

FIG. 7 is a flowchart showing a first embodiment of an emotion tag assigning method according to the present invention.

The first embodiment of the emotion tag assigning method shown in FIG. 7 is an emotion tag assigning method performed in a case where an appreciation event for appreciating a photo slide show is executed.

The event executing person prepares a plurality of photographs of the event participants as contents and stores them in the memory 12 in a reproducible state. In a case of starting an appreciation event of a photo slide show, an emotion tag assigning program is executed, photo slide show software is started, and a photo slide show using the plurality of photographs stored in the memory 12 is executed.

In the present example, a plurality of photographs are used as the content, but the content is not limited to the photograph, and a moving image may be used as the content, or the content may be a mixture of the photograph and the moving image.

The event executing person displays a list of thumbnail images used for the photo slide show on the display unit 14, operates the touch panel of the tablet PC 10, and gives an instruction to select a photograph to be displayed on the large display 30. As a result, a photograph $P_i$ selected from a plurality of photographs (n pieces of photographs $P_1$ to $P_n$) is displayed (Step S10). Here, i is a parameter for specifying a photograph currently being displayed, and may change in a range of 1 to n.

The selection instruction of the photograph may be a selection instruction to switch the photographs $P_1$ to $P_n$ in order at a favorable time while observing reactions of the event participants, or may return to the previous photograph or skip the next photograph.

The processor 11 determines whether or not there is an instruction input for event end during the display of the photograph $P_i$ (Step S12). In a case where there is an instruction input for event end (in a case of "Yes"), the present process ends, and in a case where there is no instruction input for event end (in a case of "No"), the present process proceeds to Step S14.

On the other hand, the voice detector 20 detects the voice data indicating the voice uttered by the event participant during the execution of the appreciation event, and the emotion recognizer 13A of the processor 11 acquires the voice data from the voice detector 20 during the display of the photograph $P_i$ (Step S16), recognizes (estimates) the emotion (emotion indicating whether or not the event participant is delighted) of the event participant based on the acquired voice data, and sequentially outputs the emotion information indicating the recognized emotion (Step S18).

In Step S14, determination is made whether or not there is an instruction input for switching from the photograph $P_i$ currently being displayed to a different photograph $P_j$. In a case where there is no instruction input for switching (in a case of "No"), the process proceeds to Step S10, and the display of the photograph $P_i$ currently being displayed is continued. In a case where there is an instruction input for switching (in a case of "Yes"), the process proceeds to Step S20.

In Step S20, the processor 11 (emotion rank calculation section 13B) acquires a plurality of pieces of emotion information (a plurality of pieces of emotion information in a display time zone of the photograph P) recognized in Step S18 and sequentially output, and calculates an emotion rank indicating that the event participant is delighted from a representative value of the plurality of pieces of emotion information.

The processor 11 (emotion tag assigning section 13C) assigns the emotion rank calculated in Step S20 to the content (photograph P) as an emotion tag $T_i$ (Step S22).

Subsequently, the parameter j of the photograph $P_j$ whose display is switched is changed to the parameter i of the photograph currently being displayed (Step S24), and the process returns to Step S10.

Although not shown in the flowchart shown in FIG. 7, even in a case of end of the appreciation event (a case of "Yes" in Step S12), the processes of Steps S20 and S22 are performed, and after the emotion tag $T_i$ is assigned to the photograph $P_i$ displayed last, the appreciation event ends.

In a case where a plurality of persons participate in the appreciation event, the processor 11 may specify one or more main speakers in a time zone in which a plurality of photographs are reproduced based on the voice data detected by the voice detector 20, and assign a speaker ID indicating the specified one or more main speakers to each photograph.

In the example shown in the part 5-4 of FIG. 5, the main speakers specified in the time zone (points in time $t_0$ to $t_1$) in which the photograph $P_1$ is reproduced are two persons, a speaker having a speaker ID "005" and a speaker having a speaker ID "002", and the main speakers are further different in the time zone (points in time $t_0$ to $t_1$).

The processor 11 may convert the voice data into text data based on the voice data detected by the voice detector 20, and assign at least a part of the text data to a corresponding photograph in the plurality of photographs as a comment tag.

Further, the processor 11 may display at least one of the emotion rank or the speaker information specified by the speaker ID simultaneously with the plurality of photographs during the reproduction of the plurality of photographs.

Second Embodiment of Emotion Tag Assigning Method

Figure 8:
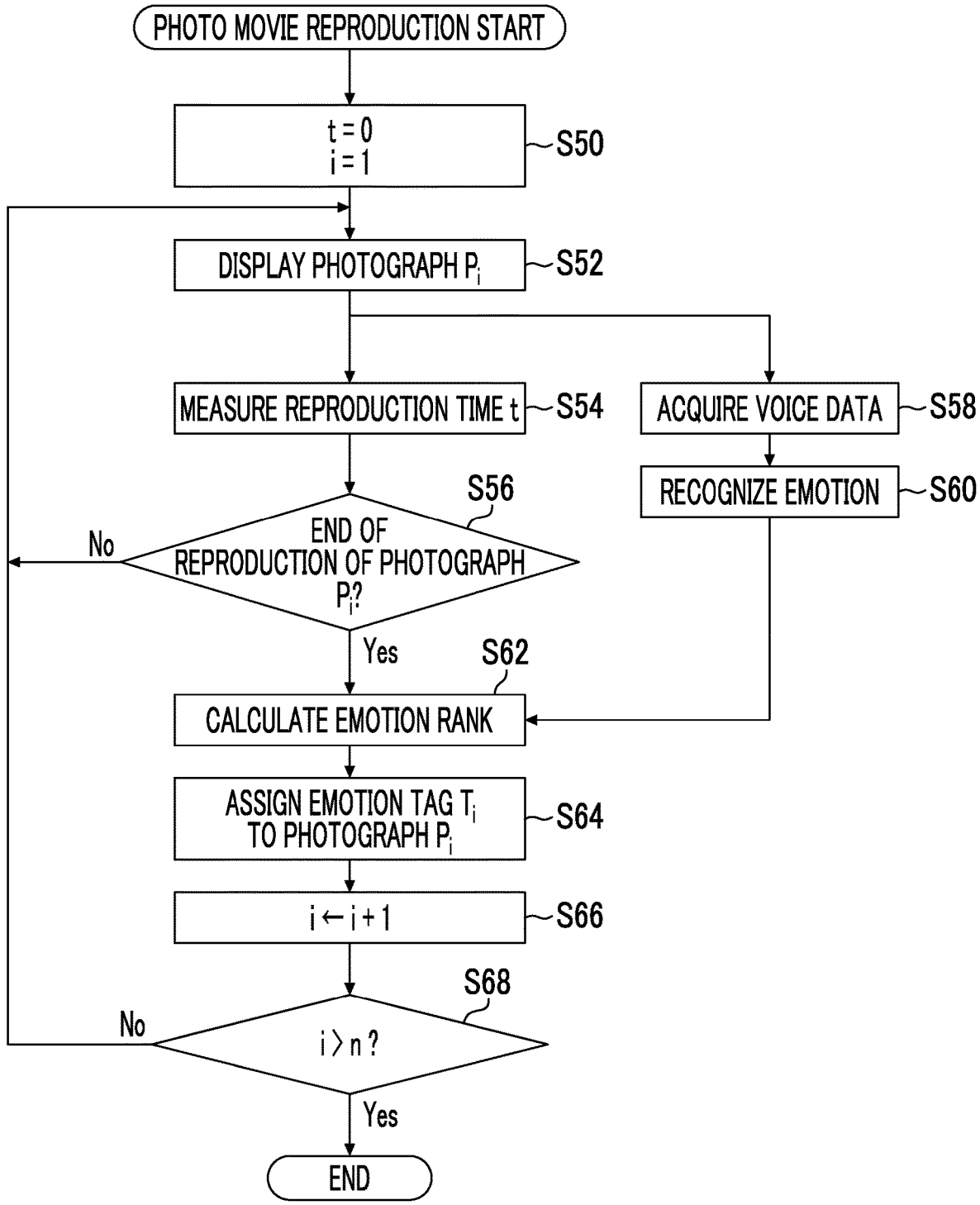
FIG. 8 is a flowchart showing a second embodiment of an emotion tag assigning method according to the aspect of the present invention.

FIG. 8 is a flowchart showing a second embodiment of the emotion tag assigning method according to the present invention.

The second embodiment shown in FIG. 8 is an emotion tag assigning method in execution of an appreciation event using a photo movie.

A photo movie is a moving image created by sequentially connecting a plurality of photographs (n pieces of photographs $P_1$ to $P_n$) by photo movie creation software. The photo movie creation software creates a moving image according to a display time of one piece of photograph, switching of each photograph (fade-in, fade-out, scrolling, or the like), and other user settings.

In FIG. 8, the processor 11 initially sets t=0 and i=0 at the start of reproduction of the photo movie (Step S50). t is a parameter indicating a reproduction time of the photo movie, i is a parameter for specifying a photograph currently being displayed, and in the present example, it changes in a range of 1 to n.

The processor 11 displays the photograph $P_i$ on a screen via the large display 30 by reproducing the photo movie (Step S52). At the start of reproduction of the photo movie, the photograph $P_1$ is displayed.

A reproduction time t is measured during the display of the photograph $P_i$ (Step S54), and determination is made whether or not the reproduction (display) of the photograph $P_i$ ends from the reproduction time t (Step S56). In a case where the reproduction time of the photograph $P_i$ is within a set reproduction time (in a case where the reproduction of the photograph $P_i$ does not end), the process returns to Step S52, and the reproduction of the photograph $P_i$ is continued.

On the other hand, the voice detector 20 detects the voice data indicating the voice uttered by the event participant during the execution of the appreciation event using the photo movie, and the emotion recognizer 13A of the processor 11 acquires the voice data from the voice detector 20 during the display of the photograph $P_i$ (Step S58), recognizes the emotion (emotion indicating whether or not the event participant is delighted) of the event participant based on the acquired voice data, and sequentially outputs the emotion information indicating the recognized emotion (Step S60).

In a case where the reproduction time of the photograph $P_i$ reaches the set reproduction time (in a case where the reproduction end of the photograph $P_i$ is determined), the process proceeds to Step S62, where the processor 11 (emotion rank calculation section 13B) acquires a plurality of pieces of emotion information (a plurality of pieces of emotion information in a display time zone of the photograph $P_i$) recognized in Step S60 and sequentially output, and calculates an emotion rank indicating that the event participant is delighted from a representative value of the plurality of pieces of emotion information.

The processor 11 (emotion tag assigning section 13C) assigns the emotion rank calculated in Step S62 to the photograph $P_i$ as an emotion tag $T_i$ (Step S64). Here, the photograph $P_i$ to which the emotion tag $T_i$ is assigned can be determined by the reproduction time t of the photo movie. This is because the reproduction time t of the photo movie and the display time zone of each photograph $P_i$ are associated with each other (see, for example, FIG. 5). In addition, the assignment of the emotion tag to each photograph can be performed by recording the emotion tag in a header of a moving image file of the photo movie or by creating a text file or the like in which the emotion tag is described in relation to a file name of the moving image file or a reproduction time of the photo movie.

Subsequently, the parameter i is incremented by 1 (Step S66), and determination is made whether or not the incremented parameter i exceeds n (i>n) (Step S68).

In a case where the parameter i does not exceed n (i≤n), the process returns to Step S52, and the processes of Steps S52 to S68 are repeated.

In a case where the parameter i exceeds n (i>n), the reproduction of all the photographs $P_1$ to $P_n$ (reproduction of the photo movie) ends, and the present process ends.

Others

The event using the content is not limited to the event of appreciating the photo slide show and the photo movie of the present embodiment, and may be an event such as music reproduction or game execution. In this case, a time-series emotion rank analyzed from the user's voice during music reproduction or game execution can be assigned as a time-series emotion tag to music reproduction or game execution.

The device (tablet PC in the present example) constituting the emotion tag assigning system may also be used as devices for executing an event using the content, or may be separate devices. In the case of separate devices, it is preferable that both devices operate in synchronization. This is to specify the content to which the emotion tag is assigned.

The various processors such as the tablet PC constituting the emotion tag assigning system according to the embodiment of the present invention include a central processing unit (CPU) that is a general-purpose processor executing the program and functioning as the various processing units, a programmable logic device (PLD) that is a processor whose circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC).

One processing unit constituting the emotion tag assigning system may be configured by one of these various processors, or may be configured by two or more processors having the same type or different types. For example, one processing unit may be configured by a combination of a plurality of FPGAs or a combination of a CPU and an FPGA. Further, a plurality of processing units may be configured by one processor. As an example of configuring a plurality of processing units by one processor, first, as represented by a computer, such as a client or a server, there is a form in which one processor is configured by a combination of one or more CPUs and software and this processor functions as a plurality of processing units. Second, as represented by a system on chip (SoC) or the like, there is a form in which a processor that realizes the function of the entire system including the plurality of processing units by one integrated circuit (IC) chip is used. Thus, the various processing units are configured by using one or more various processors as a hardware structure. Further, as the hardware structure of the various processors, more specifically, an electric circuit (circuitry) in which circuit elements such as semiconductor elements are combined may be used.

Further, the present invention includes an emotion tag assigning program installed in a computer to cause the computer to function as the emotion tag assigning system according to the embodiment of the present invention, and a non-volatile storage medium in which the emotion tag assigning program recorded.

The present invention is not limited to the above embodiments and can be subjected to various modifications without departing from the spirit of the present invention.

EXPLANATION OF REFERENCES

1: emotion tag assigning system
11: processor
12: memory
13A: emotion recognizer
13B: emotion rank calculation section
13C: emotion tag assigning section
14: display unit
15A: speaker recognizer
15B: speaker ID assigning section
16: input/output interface
17A: voice-to-text converter
17B: comment tag assigning section
18: operation unit
20: voice detector
30: large display
S10 to S24, S50 to S68: step

What is claimed is:
1. An emotion tag assigning system comprising:
a processor;
a microphone that detects voice data indicating a voice uttered by a person who participates in an event using a content during execution of the event; and
an emotion recognizer that recognizes an emotion of the person based on the voice data, wherein the emotion recognizer is implemented by the processor,
wherein the processor
acquires emotion information indicating the emotion of the person recognized by the emotion recognizer during the execution of the event using the content, and
assigns an emotion rank calculated from the acquired emotion information to the content as an emotion tag,
wherein the emotion recognizer is a recognizer implemented by the processor that is subjected to machine learning using, as training data, a large number of pieces of voice data including voice data of a voice uttered in a case where a person is delighted and voice data of a voice uttered in a case where the person is not delighted,
wherein the content is a plurality of images,
wherein the processor acquires, from the emotion recognizer, a plurality of pieces of emotion information in a time zone in which the plurality of images are reproduced, calculates an emotion rank corresponding to each image from a representative value of the plurality of pieces of emotion information, and assigns the calculated emotion rank to each image as the emotion tag by recording the emotion tag in a header of an image file comprising the plurality of images, wherein in a case where a plurality of persons participate in the event, the processor specifies one or more main speakers in the time zone in which the plurality of images are reproduced based on the voice data detected by the microphone, and assigns speaker identification information indicating the specified one or more main speakers to each image by recording the speaker identification information in the header of the image file, wherein the processor displays the emotion rank and the speaker identification information simultaneously with the plurality of images during the reproduction of the plurality of images by the image reproduction device.

2. The emotion tag assigning system according to claim 1, wherein the event is an appreciation event for sequentially reproducing the plurality of images by an image reproduction device and appreciating the reproduced plurality of images.

3. The emotion tag assigning system according to claim 2, wherein the plurality of images include a photograph or a moving image showing the person who participates in the event.

4. The emotion tag assigning system according to claim 2, wherein the processor converts the voice data into text data based on the voice data detected by the microphone, and assigns at least a part of the text data to a corresponding image in the plurality of images as a comment tag.

5. An emotion tag assigning method comprising:

a step of detecting, by a microphone, voice data indicating a voice uttered by a person who participates in an event using a content during execution of the event;

a step of recognizing, by an emotion recognizer, an emotion of the person based on the voice data, wherein the emotion recognizer is implemented by a processor;

a step of acquiring, by the processor, emotion information indicating the recognized emotion of the person during the execution of the event using the content; and a step of assigning, by the emotion recognizer, an emotion rank calculated from the acquired emotion information to the content as an emotion tag, wherein the emotion recognizer is a recognizer implemented by the processor that is subjected to machine learning using, as training data, a large number of pieces of voice data including voice data of a voice uttered in a case where a person is delighted and voice data of a voice uttered in a case where the person is not delighted, wherein the content is a plurality of images, wherein the emotion tag assigning method further comprising:

a step of acquiring from the emotion recognizer, by the processor, a plurality of pieces of emotion information in a time zone in which the plurality of images are reproduced;

a step of calculating, by the processor, an emotion rank corresponding to each image from a representative value of the plurality of pieces of emotion information; and a step of assigning, by the processor, the calculated emotion rank to each image as the emotion tag by recording the emotion tag in a header of an image file comprising the plurality of images, wherein in a case where a plurality of persons participate in the event, the processor specifies one or more main speakers in the time zone in which the plurality of images are reproduced based on the voice data detected by the microphone, and assigns speaker identification information indicating the specified one or more main speakers to each image, wherein the processor displays the emotion rank and speaker information specified by the speaker identification information simultaneously with the plurality of images during the reproduction of the plurality of images by the image reproduction device by recording the speaker identification information in the header of the image file.

6. The emotion tag assigning method according to claim 5, wherein the event is an appreciation event for sequentially reproducing the plurality of images by an image reproduction device and appreciating the reproduced plurality of images.

7. The emotion tag assigning method according to claim 6, wherein the plurality of images include a photograph or a moving image showing the person who participates in the event.

8. The emotion tag assigning method according to claim 6, wherein the processor converts the voice data into text data based on the voice data detected by the microphone, and assigns at least a part of the text data to a corresponding image in the plurality of images as a comment tag.

9. A non-transitory, computer-readable tangible recording medium which records thereon a program which causes, when read by a computer, the computer to implement:

a function of acquiring, from a microphone, voice data indicating a voice uttered by a person who participates in an event using a content during execution of the event;

a function of recognizing an emotion of the person based on the voice data;

a function of acquiring emotion information indicating the recognized emotion of the person during the execution of the event using the content; a function of assigning an emotion rank calculated from the acquired emotion information to the content as an emotion tag, wherein the content is a plurality of images;

a function of acquiring a plurality of pieces of emotion information in a time zone in which the plurality of images are reproduced;

a function of calculating an emotion rank corresponding to each image from a representative value of the plurality of pieces of emotion information; and a function of assigning the calculated emotion rank to each image as the emotion tag, wherein the function of recognizing the emotion of the person based on the voice data is an emotion recognizer implemented by the computer that is subjected to machine learning using, as training data, a large number of pieces of voice data including voice data of a voice uttered in a case where a person is delighted and voice data of a voice uttered in a case where the person is not delighted, wherein the content is a plurality of images, wherein the computer further implementing:

a function of acquiring from the emotion recognizer, by the computer, a plurality of pieces of emotion information in a time zone in which the plurality of images are reproduced;

a function of calculating, by the computer, an emotion rank corresponding to each image from a representative value of the plurality of pieces of emotion information; and a function of assigning, by the computer, the calculated emotion rank to each image as the emotion tag by recording the emotion tag in a header of an image file comprising the plurality of images, wherein in a case where a plurality of persons participate in the event, the computer specifies one or more main speakers in the time zone in which the plurality of images are reproduced based on the voice data detected by the microphone, and assigns speaker identification information indicating the specified one or more main speakers to each image by recording the speaker identification information in the header of the image file, wherein the computer displays the emotion rank and speaker information specified by the speaker identification information simultaneously with the plurality of images during the reproduction of the plurality of images by the image reproduction device.

* * * * *